(12) United States Patent
Ghislieri et al.

(10) Patent No.: US 10,407,102 B2
(45) Date of Patent: Sep. 10, 2019

(54) MOTOR-VEHICLE FLOOR-PANEL STRUCTURE INCLUDING LATERAL LONGITUDINAL BEAMS WITH LOCALLY DIFFERENTIATED FEATURES

(71) Applicant: FCA Italy S.p.A., Turin (IT)

(72) Inventors: Daniele Ghislieri, Turin (IT); Massimiliano Bogge, Turin (IT); Alessandro Bernardi, Turin (IT); Saverio Gariano, Turin (IT); Gianfranco Del Nero, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/815,904

(22) Filed: Nov. 17, 2017

(65) Prior Publication Data

US 2018/0162449 A1 Jun. 14, 2018

(30) Foreign Application Priority Data

Dec. 14, 2016 (EP) ..................................... 16203959

(51) Int. Cl.
*B62D 21/15* (2006.01)
*B62D 65/02* (2006.01)
(Continued)

(52) U.S. Cl.
CPC ......... *B62D 21/157* (2013.01); *B62D 25/025* (2013.01); *B62D 25/2018* (2013.01); *B62D 29/007* (2013.01); *B62D 65/02* (2013.01)

(58) Field of Classification Search
CPC ......... B62D 21/15; B62D 65/02; B62D 29/00
(Continued)

(56) References Cited

U.S. PATENT DOCUMENTS 4,054,770 A 10/1977 Jackson et al.
6,099,194 A * 8/2000 Durand ................. B62D 21/02
296/204
(Continued)

FOREIGN PATENT DOCUMENTS

DE 19505364 A1 8/1996
JP 2002173055 A 6/2002
(Continued)

OTHER PUBLICATIONS

European Search Report dated Jun. 1, 2017, for European Patent Application 16203959.8, 5 pages.

*Primary Examiner* — D Glenn Dayoan
*Assistant Examiner* — Sunsurraye Westbrook
(74) *Attorney, Agent, or Firm* — RMCK Law Group PLC

(57) ABSTRACT

A floor-panel structure for a vehicle includes a front body subassembly, a front floor structure, including a central longitudinal tunnel, two lateral longitudinal beams, connected to the floor structure and the body subassembly, and two intermediate longitudinal beams, which connect the floor structure to the body subassembly and extend in areas between the lateral longitudinal beams and central longitudinal tunnel. The lateral longitudinal beams each include a sheet-metal profile element having an open cross section, a front portion reinforced for withstanding relatively high axial loads, and a remaining portion that is more ductile than said front portion so as to be more liable to collapse. Each lateral longitudinal beam is constituted by a single sheet element of steel, and said reinforced front portion is constituted by a hardened portion obtained by subjecting only the front portion to a thermal treatment using high-frequency induction heating.

5 Claims, 7 Drawing Sheets

(51) Int. Cl.
*B62D 29/00* (2006.01)
*B62D 25/02* (2006.01)
*B62D 25/20* (2006.01)

(58) Field of Classification Search
USPC .............. 296/193.07, 187.08, 204, 64, 97.23
See application file for complete search history.

(56) References Cited

U.S. PATENT DOCUMENTS

| | | | |
|---|---|---|---|
| 6,285,015 | B1 | 9/2001 | Doizaki et al. |
| 8,424,912 | B2* | 4/2013 | Favaretto ................ B62D 21/12 |
| | | | 280/781 |
| 2006/0151481 | A1 | 7/2006 | Roehr et al. |
| 2008/0264932 | A1 | 10/2008 | Hirota |
| 2010/0072192 | A1 | 3/2010 | Hirota |
| 2010/0108665 | A1 | 5/2010 | Hirota |
| 2010/0270830 | A1* | 10/2010 | Maruyama .............. B62D 25/02 |
| | | | 296/209 |
| 2011/0254315 | A1 | 10/2011 | Pellmann et al. |
| 2012/0086238 | A1* | 4/2012 | Tan ...................... B62D 25/025 |
| | | | 296/209 |
| 2013/0140854 | A1* | 6/2013 | Mori .................... B62D 25/025 |
| | | | 296/209 |
| 2015/0061320 | A1* | 3/2015 | Yabu ....................... B60R 19/18 |
| | | | 296/187.1 |

FOREIGN PATENT DOCUMENTS

| | | |
|---|---|---|
| JP | 2003261072 A | 9/2003 |
| WO | 2015156052 A1 | 10/2015 |
| WO | 2016035893 A1 | 3/2016 |

* cited by examiner

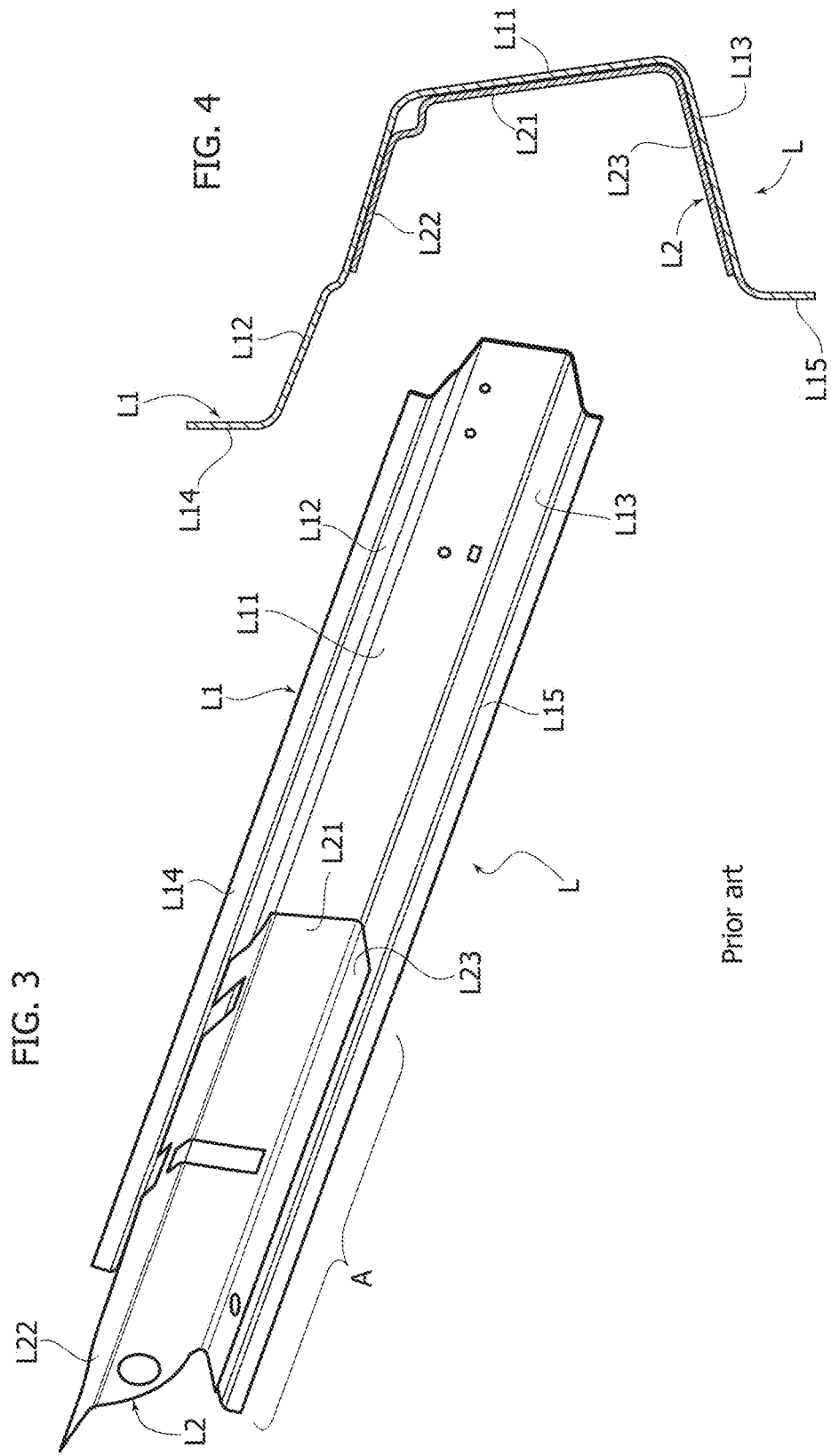

MOTOR-VEHICLE FLOOR-PANEL STRUCTURE INCLUDING LATERAL LONGITUDINAL BEAMS WITH LOCALLY DIFFERENTIATED FEATURES

CROSS REFERENCE TO RELATED APPLICATIONS

This application claims priority to European Patent Application No. 16203959.8 filed on Dec. 14, 2016, the entire disclosure of which is incorporated herein by reference.

FIELD OF THE INVENTION

The present invention relates to floor-panel structures for motor vehicles, of the type comprising:
a front body subassembly;
front floor structure, including a central longitudinal tunnel;
a pair of lateral longitudinal beams, connected to the front floor structure and to the front body subassembly; and
two intermediate longitudinal beams that connect the front floor structure to the front body subassembly and that extend at intermediate areas between the lateral longitudinal beams and the central tunnel,
wherein said lateral longitudinal beams each comprise a sheet-metal profile element having an open cross-section, including a vertical wall, and a top wall and a bottom wall, which project outwardly from the vertical wall,
wherein each of said lateral longitudinal beams comprises a front portion reinforced for withstanding relatively high axial loads following upon head-on collisions of the motor vehicle, and a remaining portion of the longitudinal beam that is more ductile than said front portion so as to be more liable to collapse, thus absorbing impact energy, in the case of a collision of the respective side of the vehicle against a concentrated obstacle, such as a post or the like.

PRIOR ART

FIGS. 1-5 of the annexed drawings show a floor-panel structure for a motor vehicle of the type specified above, produced according to the prior art.

With reference to FIG. 1, number 1 generally designates a front body subassembly rigidly connected, for example by means of a plurality of electrical welding spots, to a front floor structure that is generally designated by the reference number 2. The structures 1 and 2 are constituted by pressed sheet-metal elements welded together. FIG. 1 shows only some components of the front body subassembly, specifically a front firewall 1A and side walls 1B.

In accordance with the prior art, the motor-vehicle floor-panel structure moreover comprises a pair of lateral longitudinal beams L. Each lateral longitudinal beam L is welded to a respective lateral edge of the front floor structure 2, as well as to a bottom portion of the side wall 1B.

With reference also to FIG. 2, which shows a view from below of the entire motor-vehicle floor-panel structure, this structure moreover comprises two intermediate longitudinal beams 3 that connect the front body subassembly 1 and the front floor structure 2 together and that moreover connect together the front floor structure 2 and a rear floor structure 4. The two intermediate longitudinal beams 3 extend in areas transversely intermediate between the lateral longitudinal beams L and the central tunnel T.

GENERAL TECHNICAL PROBLEM

The two lateral longitudinal beams L must perform two main functions. In the event of head-on impact of the motor vehicle, each lateral longitudinal beam has to support adequately the front body subassembly and be sufficiently stable under the action of forces in a longitudinal direction. Particularly in the case of impact with partial overlap between the vehicle and the obstacle, each lateral longitudinal beam L must be able to withstand the forces deriving from direct contact of the lateral longitudinal beam with the front wheel of the motor vehicle and with the components of the front suspension of the motor vehicle, without being subject to structural instability and in such a way as to guarantee integrity of the passenger compartment of the motor vehicle in the area of the feet and legs of the occupants.

A second important function is performed by each lateral longitudinal beam L in the case of lateral impact against a concentrated obstacle, such as a post or the like. In this case, the lateral longitudinal beam must be sufficiently ductile to collapse with a bending deformation, thus absorbing impact energy, without generating fractures or fragments that may prove to be dangerous for the occupant on account of uncontrolled intrusion into the side of the vehicle.

In order to meet in the best way the two aforesaid needs, it is known to build each lateral longitudinal beam L in the way illustrated in FIGS. 3, 4, and 5. According to this known solution, each lateral longitudinal beam L has a structure constituted by two elements welded together by means of electrical spot welding. A first element L1 constitutes the main body of the longitudinal beam and is in the form of a sheet-metal profile element having a relatively small thickness, with an open cross section, defined by a vertical wall L11, and a top wall L12 and a bottom wall L13, which project from the vertical wall L11 outwards and terminate with a respective top flange L14 and a respective bottom flange L15. The second element constituting each lateral longitudinal beam L is a second sheet-metal profile element L2 having a cross section corresponding to a central portion of the cross section of the profile element L1 (see FIG. 4) so as that it can be received within a front portion A (FIG. 3) of the lateral longitudinal beam L. Also the element L2 has a vertical wall L21, and a top wall L22 and a bottom wall L23, which project from the vertical wall L21 outwards. In the condition where they are coupled and welded to the front portion A of the first element L1, the walls L21, L22, L23 are respectively in contact with the walls L11, L12, L13, as shown in FIG. 4.

The known solution illustrated in FIGS. 3-5 enables the purpose to be achieved of a greater resistance in regard to stresses in a longitudinal direction in the front part A of the lateral longitudinal beam, and a greater ductility in the remaining part of the longitudinal beam. However, this result is obtained with a relatively heavy structure and with a relatively complicated manufacturing process, requiring execution of the operations of spot welding necessary for connecting the two elements L1, L2 constituting each lateral longitudinal beam.

OBJECT OF THE INVENTION

The object of the present invention is to overcome the drawbacks of the known solution mentioned above by providing a floor-panel structure in which the lateral longitudinal beams will be able to fully perform the two above described main functions, while having a structure which is simple has a reduced weight and is also simple and cheap to manufacture.

SUMMARY OF THE INVENTION

With a view to achieving the aforesaid object, the subject of the present invention is a floor-panel structure for a motor vehicle having the characteristics outlined at the start of the present description and moreover characterized in that each lateral longitudinal beam is constituted by a single sheet element made of steel and in that said reinforced front portion of each lateral longitudinal beam is constituted by a hardened portion obtained by subjecting only the front portion of said single sheet element made of steel to a thermal treatment by means of high-frequency induction heating.

The technology of high-frequency induction-heating is in itself known and has been used for some time. In particular, there are already known high-frequency induction-heating devices that enable metal elements such as steel plates or profile elements to undergo thermal treatment even only in a portion thereof. Devices of this type are, for example, disclosed in US 2008264932, US 2010108665, U.S. Pat. No. 6,285,015, US 2010072192, U.S. Pat. No. 4,054,770, US 2006151481, WO 2016035893. Studies and tests conducted by the present applicant have shown that the application of this technology to the manufacture of the lateral longitudinal beams of a floor-panel structure of the type that has been described above enables many advantages to be achieved. On the one hand, the front portion of each lateral longitudinal beam can be obtained with a relatively small thickness and using a steel with lower structural characteristics, and notwithstanding this, thanks to the thermal treatment, on the other hand, an adequate resistance to longitudinal loads can be guaranteed for the front portion of the lateral longitudinal beam. At the same time, the remaining portion of each lateral longitudinal beam can have the characteristics of ductility required to undergo deformation without any formation of fragments or fractures following upon lateral impact against a concentrated obstacle, such as a post or the like.

Thanks to the thermal treatment mentioned above, the yield point of the material constituting the lateral longitudinal beam in the aforesaid front portion that is subjected to treatment is increased.

Preferably, also in the aforesaid front portion of each lateral longitudinal beam there are areas that are not subjected to thermal treatment. In particular, areas of the front portion of each lateral longitudinal beam that are used for welding to adjacent parts of the motor-vehicle structure are not subjected to thermal treatment. Moreover areas of the aforesaid front portion of the longitudinal beam that present geometrical discontinuities, for example due to eyelets, holes, or cuts formed in the lateral longitudinal beam, are not subjected to thermal treatment.

The subject of the invention is also a method for forming a floor-panel structure for a motor vehicle, provided in which is:
  a front body subassembly;
  a front floor structure, including a central longitudinal tunnel;
  a pair of lateral longitudinal beams, connected to the front floor structure and to the front body subassembly; and
  two intermediate longitudinal beams, which connect the front body subassembly to the front floor structure and extend at intermediate areas between the lateral longitudinal beams and the central tunnel,
  wherein said lateral longitudinal beams each comprise a sheet-metal profile element having an open cross section, including a vertical wall, and a top wall and a bottom wall, which project from the vertical wall outwards, and
  wherein each of said lateral longitudinal beams comprises a front portion reinforced for withstanding relatively high axial loads following upon head-on collisions of the motor vehicle, and a remaining portion of the longitudinal beam that is more ductile than said front portion so as to be more liable to collapse, thus absorbing impact energy, in the case of collision of the respective side of the vehicle against a concentrated obstacle, such as a post or the like said method being characterized in that each lateral longitudinal beam is constituted by a single sheet element made of steel and in that said reinforced front portion of each lateral longitudinal beam is obtained by subjecting only the front portion of said single sheet element made of steel to a thermal treatment by means of high-frequency induction heating.

DETAILED DESCRIPTION OF A PREFERRED EMBODIMENT

Further characteristics and advantages of the invention will emerge from the ensuing description with reference to the annexed drawings, which are provided purely by way of non-limiting example and in which:

FIG. 3 is a perspective view of a lateral longitudinal beam forming part of the motor-vehicle structure represented in FIGS. 1 and 2, according to the prior art;

FIG. 4 is a cross-sectional view of the lateral longitudinal beam according to the prior art that is illustrated in FIG. 3;

Figure 9:
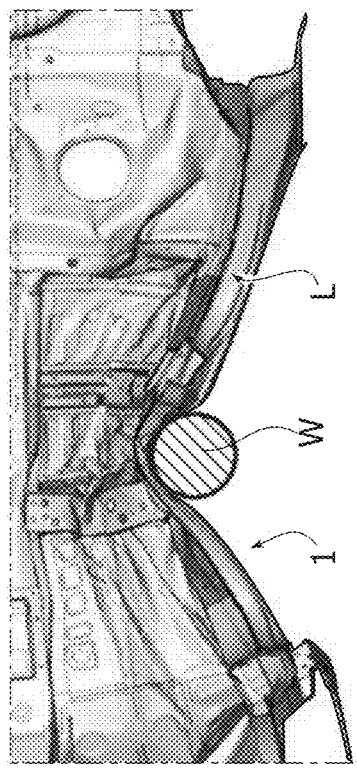
FIG. 9 shows a side view of the motor-vehicle structure in a deformed condition following upon a head-on collision against an obstacle.
Figure 10:
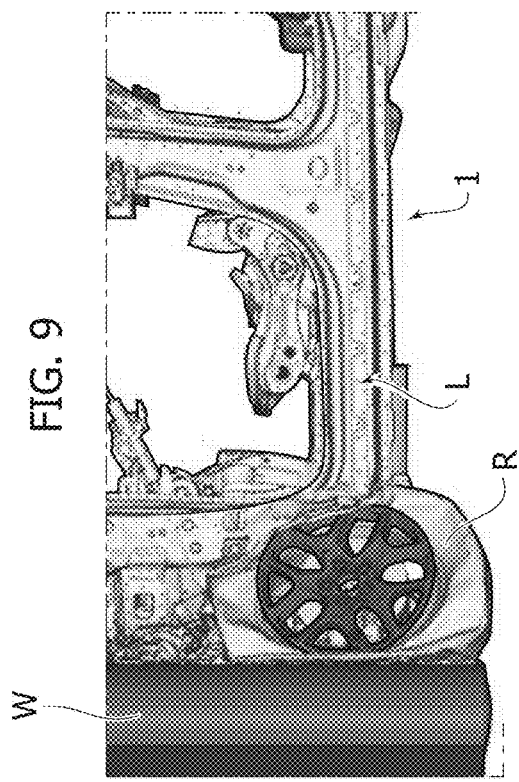
Figure 11:
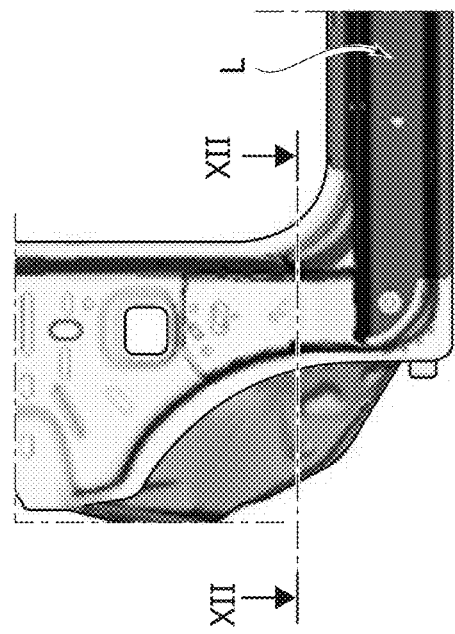
Figure 12:
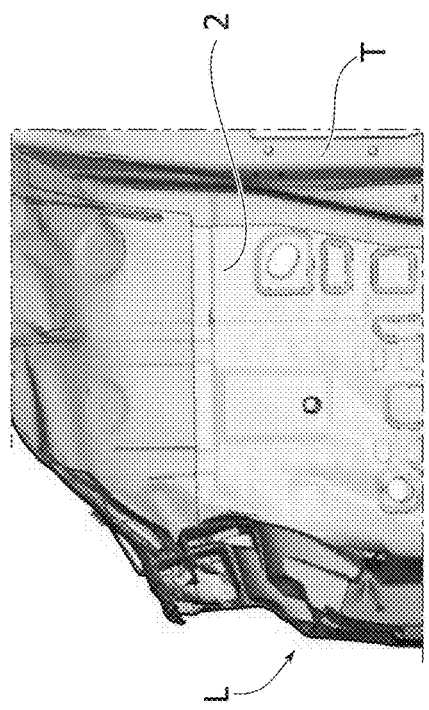

FIG. 10 is a plan view that shows the deformation of the motor-vehicle structure following upon a lateral collision against a concentrated obstacle, such as a post or the like; and FIG. 11 shows a view of a side of the front structure of the motor vehicle in a plane orthogonal to the longitudinal direction of the motor vehicle; and FIG. 12 shows a cross-sectional view according to the line XII-XII of FIG. 11, which illustrates the structure in the deformed condition following upon a head-on collision like the one illustrated in FIG. 9.

The solution according to the prior art illustrated in FIGS. 1-5 has already been described above. In FIGS. 6-12, parts that are in common with, or correspond to, those illustrated in FIGS. 1-5 are designated by the same reference numbers.

Figure 1:
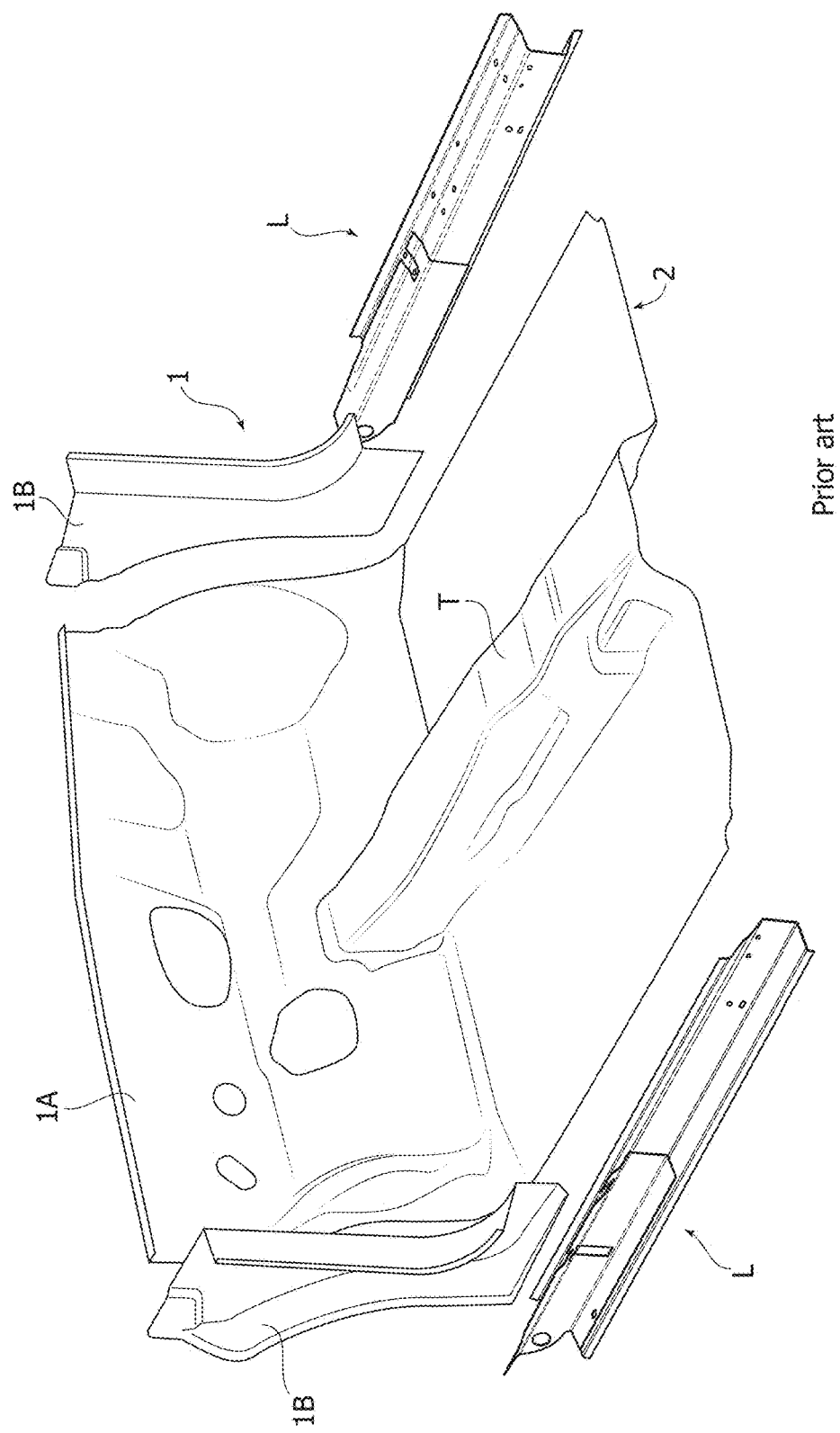
FIG. 1 is a perspective view of some parts constituting a motor-vehicle structure, according to the prior art.
Figure 2:
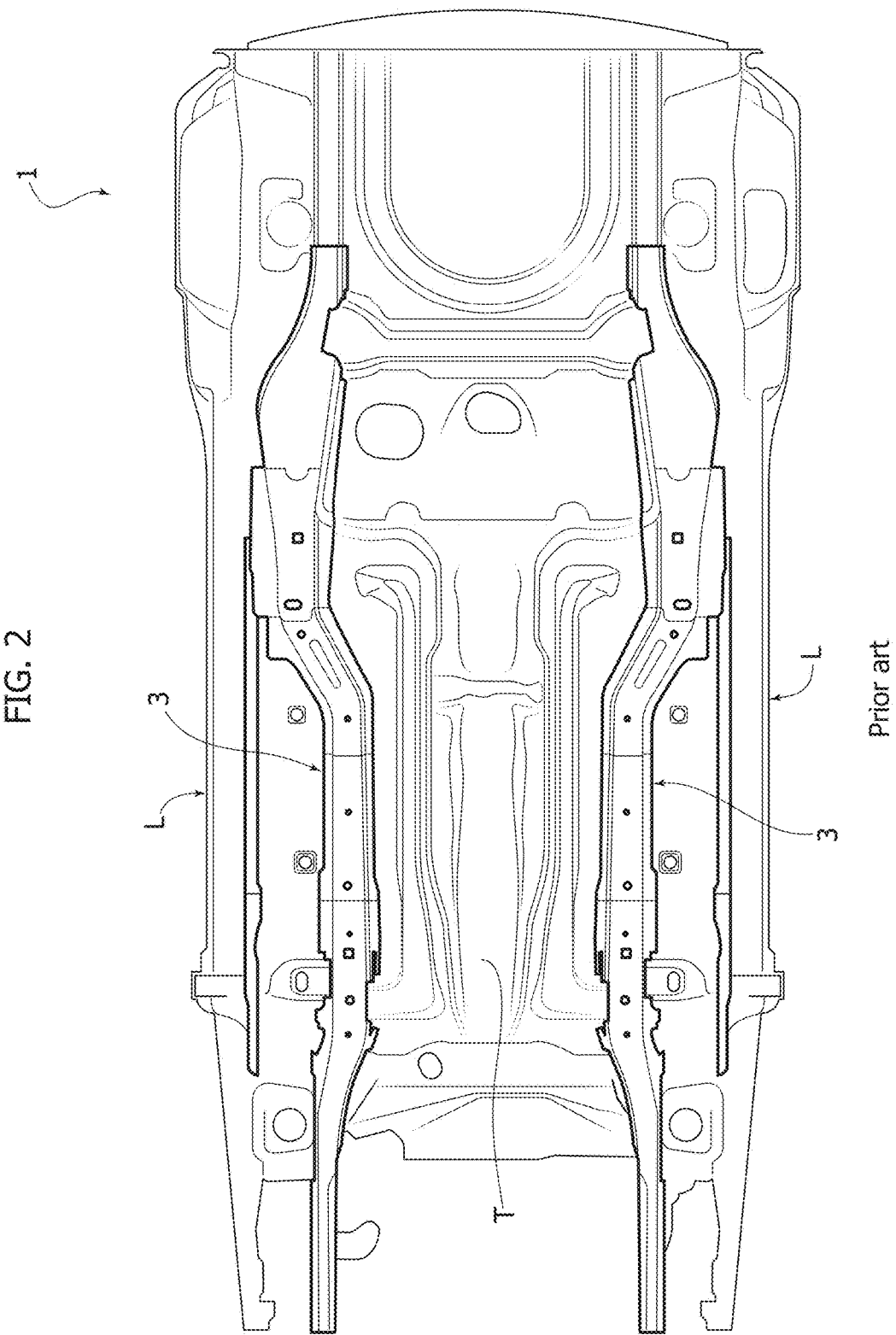
FIG. 2 is a view from beneath of a motor-vehicle structure including the parts illustrated in FIG. 1, according to the prior art.
Figure 5:
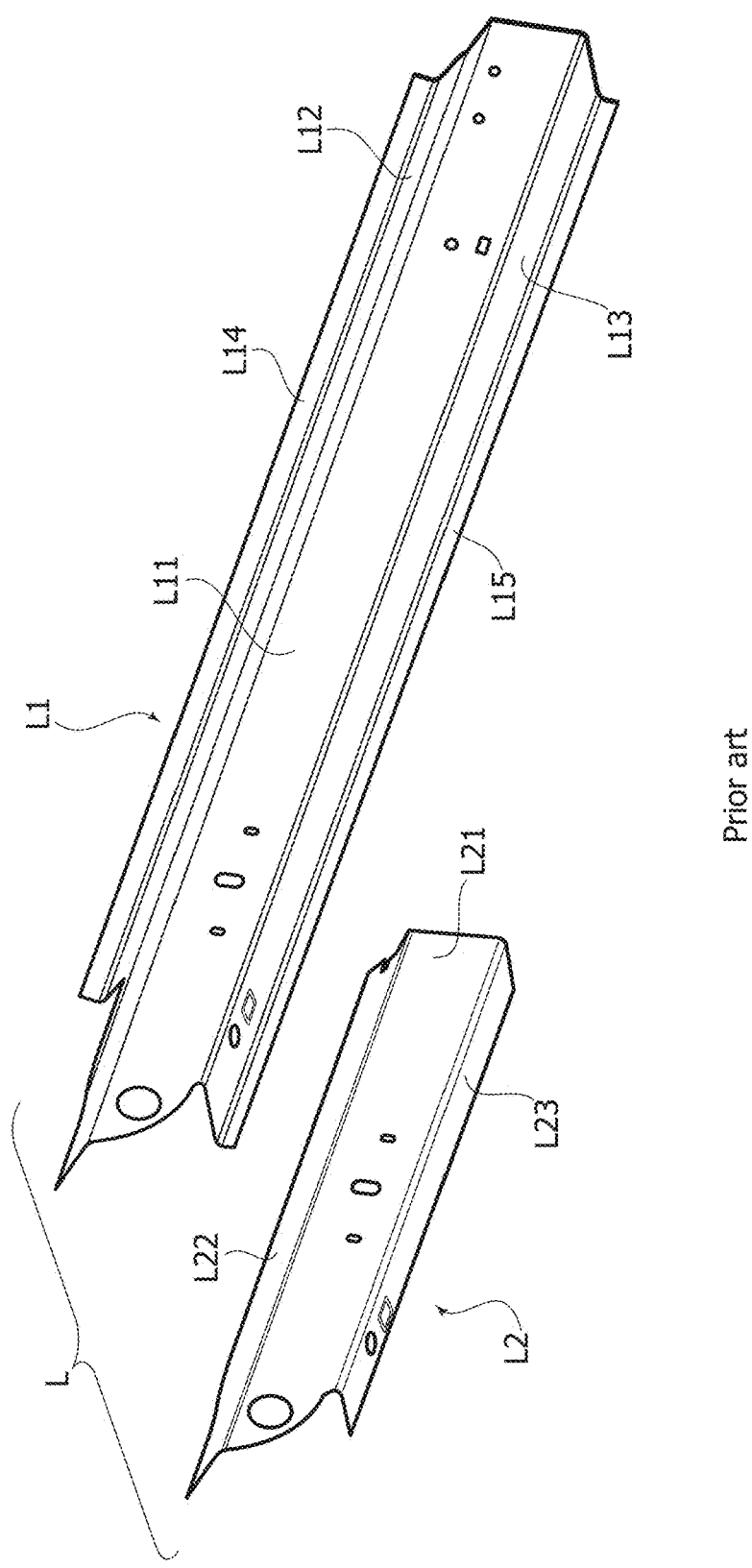
FIG. 5 is an exploded perspective view of the lateral longitudinal beam according to the prior art that is illustrated in FIG. 3.
Figure 6:
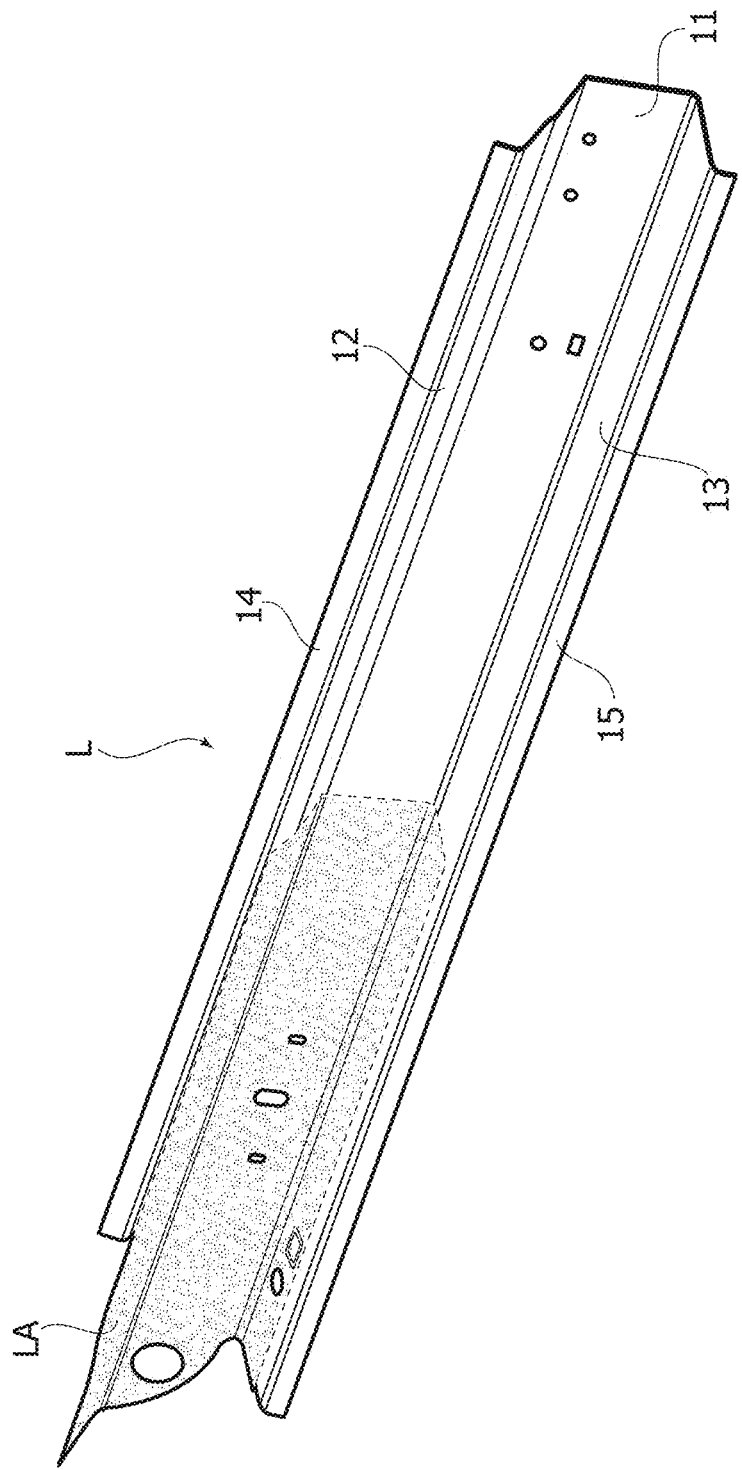
FIG. 6 illustrates a first perspective view of a preferred embodiment of a lateral longitudinal beam forming part of a motor-vehicle structure obtained according to the present invention.
Figure 7:
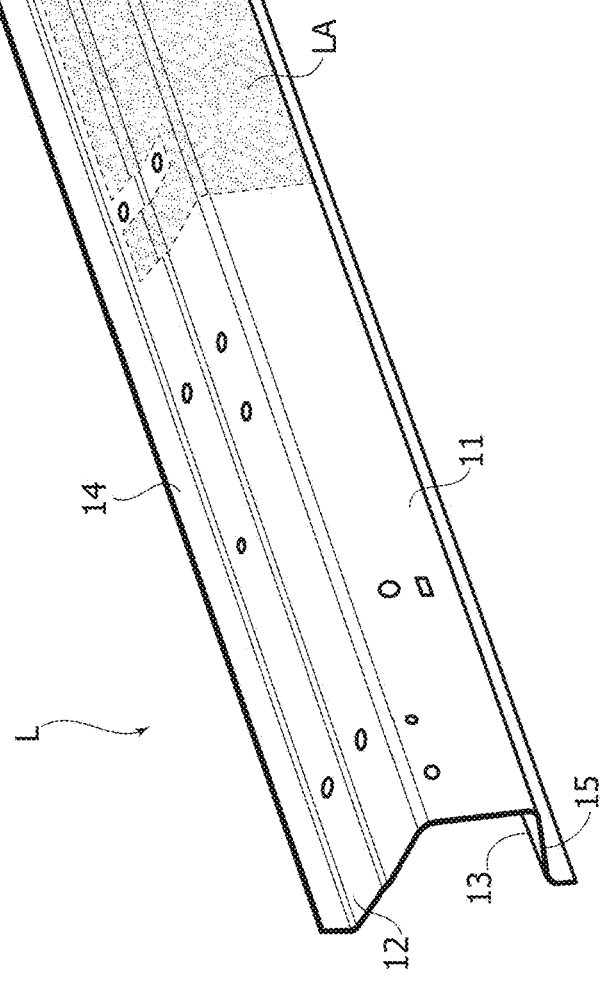
FIG. 7 illustrates a second perspective view of the lateral longitudinal beam of FIG. 6.
Figure 8:
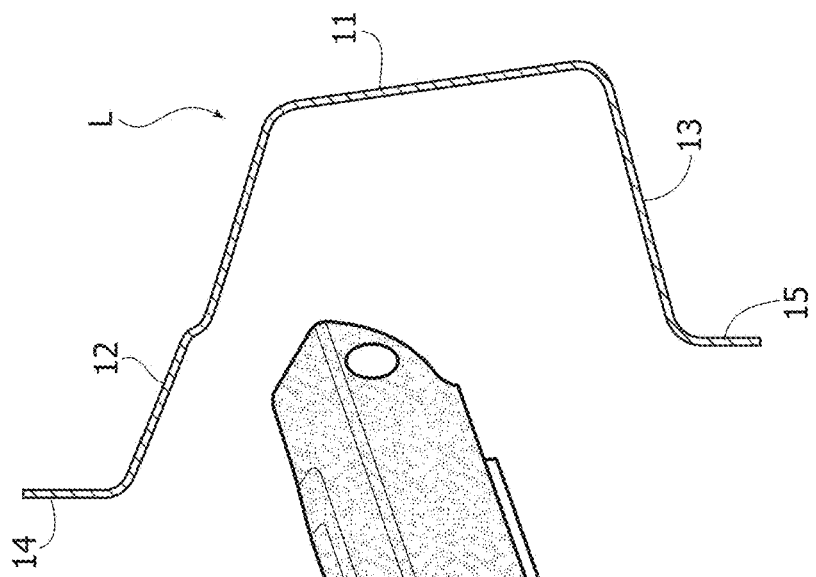
FIG. 8 illustrates a cross-sectional view of the lateral longitudinal beam of FIGS. 6 and 7.

The main difference of the invention as compared to the known solution lies in the fact that each lateral longitudinal beam L is constituted by a single element of pressed steel sheet. FIGS. 6 and 7 are perspective views of the two opposite sides of the longitudinal beam L. Also in this case (see FIG. 8) the longitudinal beam has a cross section with a vertical wall 11, a top wall 12 and a bottom wall 13, which project from the vertical wall 11 outwards and terminate with a top flange 14 and a top flange 15. As may be seen in FIGS. 6 and 7, the top flange 14 is interrupted at a certain distance from the front end of the lateral longitudinal beam L. A front portion LA of the lateral longitudinal beam L, identified with a dotted surface in FIGS. 6 and 7, forms an integral part of the single sheet-steel element constituting the lateral longitudinal beam L, but has characteristics differentiated from the remaining part of the longitudinal beam, and in particular a higher yield point so as to present a greater resistance in regard to axial loads, thanks to a localized thermal treatment to which it is subjected.

According to an important characteristic of the invention, the thermal treatment to which the front portion LA of each lateral longitudinal beam L is subjected is a treatment of high-frequency induction heating.

As already mentioned above, high-frequency induction-heating technology has been known for some time and is used in numerous sectors. High-frequency induction-heating devices are moreover known, comprising one or more windings that are provided adjacent to the component to be heated. For example, for the purposes of the present invention, for subjecting to a high-frequency induction heating the front portion LA of each lateral longitudinal beam L, a device of the type known from any one of the documents Nos. US 2008264932, US 2010108665, U.S. Pat. No. 6,285, 015, US 2010072192, U.S. Pat. No. 4,054,770, US 2006151481, and WO 2016035893 may be used.

In an actual application, the present applicant initially produced the lateral longitudinal beam in accordance with the prior art illustrated in FIGS. 1-5. The longitudinal beam had a total length of approximately 1280 mm and included a reinforcement element L2 having a length of approximately 630 mm. The material chosen for the two elements L1, L2 that made up each lateral longitudinal beam L was a dual-phase steel coded DP800. The element L1 was obtained by pressing a steel sheet having a thickness of 1.4 mm, whereas the reinforcement element L2 was obtained by pressing a steel sheet having a thickness of 1.5 mm. Consequently, along the front portion of the lateral longitudinal beam L in which the two elements L1, L2 were set on top of one another a total thickness of approximately 3 mm was reached. The rigid connection between the two elements L1, L2 was obtained by application of forty-two welding spots, which obviously constituted a major increase in times and costs of the component. The total weight of each lateral longitudinal beam L was 4.9 kg.

In actually applying the invention to the case described above, the present applicant was able to produce each lateral longitudinal beam L in a single piece made of DP600 steel (i.e., a steel of a lower quality than DP800 steel) by then subjecting the front portion LA (FIGS. 6, 7) of the longitudinal beam to a thermal treatment, by means of high-frequency induction heating. Also in this case the total length of the longitudinal beam was 1280 mm, whereas the area subjected to thermal treatment had a length of approximately 590 mm. Following upon use of a lower-quality material (DP600 instead of DP800) the thickness of the steel sheet was chosen at 1.6 mm. This thickness was obviously constant throughout all the areas of the lateral longitudinal beam L, the latter being made of a single piece. The total weight of each longitudinal beam was 4.2 kg, namely 0.7 kg lighter than the known solution. At the same time, the longitudinal beam according to the invention was altogether in compliance with the requirements of resistance to axial loads in its front portion and of deformability, with low risk of fracture in its remaining portion in the event of lateral impact.

With reference once again to the above actual example, FIG. 9 of the annexed drawings shows a side view of the motor-vehicle structure that has undergone deformation as a result of collision against an obstacle W, where the vehicle partially wraps round the obstacle, which brings the front wheel R to push against the front end of the respective lateral longitudinal beam. As may be seen, the integrity of the passenger compartment and the safety for the feet of the occupants are preserved. Likewise, FIG. 10 is a plan view that shows the permanent deformation of the lateral longitudinal beam following upon lateral impact against a post W. The lateral longitudinal beam is able to undergo a considerable permanent deformation without triggering fracture or forming fragments that might constitute a risk for the occupants.

FIG. 12 is a further cross-sectional view, according to the line XII-XII of FIG. 11, which shows deformation of the front end of the lateral longitudinal beam in the condition illustrated in FIG. 9.

To return once again to FIGS. 6 and 7, the front portion LA of each lateral longitudinal beam that is subjected to thermal treatment includes areas that are masked so as not to undergo the thermal treatment, in so far as they contain geometrical discontinuities, for example on account of the presence of eyelets, holes, or cuts. Moreover the portion LA subjected to thermal treatment does not extend up to including the top and bottom flanges 14, 15, which are provided for welding to adjacent components of the structure of the motor vehicle.

Naturally, without prejudice to the principle of the invention, the details of construction and the embodiments may vary widely with respect to what has been described and illustrated herein purely by way of example, without thereby departing from the scope of the present invention.

The invention claimed is:

1. A floor-panel structure for a motor vehicle, comprising:
   a front body subassembly;
   a front floor structure, including a central longitudinal tunnel-shaped portion;
   a pair of laterally outboard longitudinal beams, connected to the front floor structure and to the front body subassembly; and
   two intermediate longitudinal beams that connect the front floor structure to the front body subassembly and that extend at laterally intermediate areas between the laterally outboard longitudinal beams and the central longitudinal tunnel-shaped portion, said intermediate longitudinal beams being separate and laterally spaced apart from both said laterally outboard longitudinal beams and said central longitudinal tunnel-like portion,
   wherein said laterally outboard longitudinal beams each comprise a sheet-metal profile element having an open cross section, including a vertical wall, and a top wall and a bottom wall, which project from the vertical wall outwards, and wherein each of said laterally outboard longitudinal beams comprises a front end portion which is to face longitudinally forwardly in the mounted condition on the motor vehicle, said front end portion being reinforced relative to a remaining portion of the laterally outboard longitudinal beam for withstanding relatively high axial loads following upon head-on collisions of the motor vehicle, the remaining portion of each laterally outboard longitudinal beam being more ductile than said front portion so as to be more liable to collapse, thus absorbing impact energy, in a case of a collision of a respective side of the vehicle against a concentrated obstacle, wherein each laterally outboard longitudinal beam is constituted by a single sheet element of steel and said reinforced front end portion of each laterally outboard longitudinal beam is constituted by a thermally hardened portion having a higher yield point than the remaining portion, obtained by subjecting only the front end portion of said single sheet element of steel to a thermal treatment using high-frequency induction heating.

2. The structure according to claim 1, wherein said hardened portion of each lateral longitudinal beam does not cover areas of said front portion that present geometrical discontinuities such as holes and eyelets.

3. The structure according to claim 1, wherein each of said lateral longitudinal beams has a top flange and a bottom flange formed by the free edges of said top wall and of said bottom wall; and wherein said hardened portion does not extend over said top and bottom flanges.

4. The structure according to claim 3, wherein said single sheet element made of steel is constituted by a dual-phase steel.

5. A method for forming a floor-panel structure for a motor vehicle, provided in which are:
   a front body subassembly;
   a front floor structure, including a central longitudinal tunnel-shaped portion;
   a pair of laterally outboard longitudinal beams, connected to the front floor structure and to the front body subassembly; and
   two intermediate longitudinal beams that connect the front floor structure to the front body subassembly and that extend at laterally intermediate areas between the laterally outboard longitudinal beams and the central longitudinal tunnel-shaped portion, said intermediate longitudinal beams being separate and laterally spaced apart from both said laterally outboard longitudinal beams and said central longitudinal tunnel-like portion,
   wherein said laterally outboard longitudinal beams each comprise a sheet-metal profile element having an open cross section, including a vertical wall, and a top wall and a bottom wall, which project from the vertical wall outwards, and
   wherein each of said laterally outboard longitudinal beams comprises a front end portion which is to face longitudinally forwardly in the mounted condition on the motor vehicle, said front end portion being reinforced relative to a remaining portion of the laterally outboard longitudinal beam for withstanding relatively high axial loads following upon head-on collisions of the motor vehicle, the remaining portion of each laterally outboard longitudinal beam being more ductile than said front portion so as to be more liable to collapse, thus absorbing impact energy, in a case of a collision of a respective side of the vehicle against a concentrated obstacle,
   said method comprising:
      forming each laterally outboard longitudinal beam as a single sheet element made of steel; and
      obtaining the reinforced front end portion by subjecting only the front end portion of said single sheet element of steel to a thermal treatment using high-frequency induction heating such that only the front end portion is thermally hardened and has a higher yield point relative to the remaining portion.

* * * * *